US010645759B2

(12) United States Patent
Schall et al.

(10) Patent No.: US 10,645,759 B2
(45) Date of Patent: May 5, 2020

(54) TRANSPARENT PANE WITH AN ELECTRICAL HEATING LAYER AND PRODUCTION METHOD THEREOF

(71) Applicant: SAINT-GOBAIN GLASS FRANCE, Courbevoie (FR)

(72) Inventors: Guenther Schall, Kreuzau (DE); Valentin Schulz, Niederzier (DE)

(73) Assignee: SAINT-GOBAIN GLASS FRANCE, Courbevoie (FR)

(*) Notice: Subject to any disclaimer, the term of this patent is extended or adjusted under 35 U.S.C. 154(b) by 314 days.

(21) Appl. No.: 15/531,729

(22) PCT Filed: Dec. 10, 2015

(86) PCT No.: PCT/EP2015/079223
§ 371 (c)(1),
(2) Date: May 30, 2017

(87) PCT Pub. No.: WO2016/096593
PCT Pub. Date: Jun. 23, 2016

(65) Prior Publication Data
US 2017/0339750 A1 Nov. 23, 2017

(30) Foreign Application Priority Data
Dec. 16, 2014 (EP) .................... 14198262

(51) Int. Cl.
H05B 3/84 (2006.01)
B23K 26/351 (2014.01)
B23K 101/36 (2006.01)

(52) U.S. Cl.
CPC ............. H05B 3/84 (2013.01); B23K 26/351 (2015.10); B23K 2101/36 (2018.08);
(Continued)

(58) Field of Classification Search
CPC ................ H05B 3/84; H05B 2203/003; H05B 2203/004; H05B 2203/005;
(Continued)

(56) References Cited

U.S. PATENT DOCUMENTS 4,322,605 A * 3/1982 Stimens .................. H05B 3/32
174/138 J
5,886,321 A * 3/1999 Pinchok, Jr. ...... B32B 17/10036
219/203
(Continued)

FOREIGN PATENT DOCUMENTS

CN 203027514 U 6/2013
CN 103228069 A 7/2013
(Continued)

OTHER PUBLICATIONS

Machine Translation of Russian Patent Publication RU-2483494-C2, May 2013, Chevordaev Valentin Mikhajlo (Year: 2013).*
(Continued)

Primary Examiner — Lorne E Meade
Assistant Examiner — Michael S. Poetzinger
(74) Attorney, Agent, or Firm — Pillsbury Winthrop Shaw Pittman LLP

(57) ABSTRACT

A transparent pane is described, having an electrical heating layer extending at least over part of the pane surface and divided into a main heating region and an additional heating region electrically insulated therefrom. The transparent pane has connection means, which can be electrically connected to a voltage source and which has at least a first collecting conductor and a second collecting conductor. The collecting conductors are each electrically connected to the heating layer in the main heating region in direct contact such that upon application of a supply voltage, a heating current flows across a heating field formed by the heating layer. The
(Continued)

transparent pane has at least one electrical line heating element, which is arranged, at least in sections, in the additional heating region of the heating layer.

22 Claims, 8 Drawing Sheets

(52) U.S. Cl.
CPC .. *H05B 2203/003* (2013.01); *H05B 2203/004* (2013.01); *H05B 2203/005* (2013.01); *H05B 2203/013* (2013.01); *H05B 2203/014* (2013.01); *H05B 2203/017* (2013.01); *H05B 2203/031* (2013.01); *H05B 2203/037* (2013.01)

(58) Field of Classification Search
CPC ........ H05B 2203/013; H05B 2203/014; H05B 2203/017; H05B 2203/031; H05B 2203/037; B23K 26/351; B23K 2101/36
USPC ............... 219/203, 542, 543, 544, 214, 522; 338/306; 29/260
See application file for complete search history.

(56) References Cited

U.S. PATENT DOCUMENTS

| | | |
|---|---|---|
| 7,026,577 B2 | 4/2006 | Maeuser et al. |
| 9,283,733 B2 | 3/2016 | Blanchard et al. |
| 9,573,846 B2 | 2/2017 | Schall |
| 2006/0096967 A1* | 5/2006 | Weiss ........................ H05B 3/84 219/203 |
| 2010/0270280 A1* | 10/2010 | Blanchard ......... B32B 17/10036 219/203 |
| 2011/0042370 A1* | 2/2011 | Choi .................... C03C 17/3644 219/553 |
| 2014/0027434 A1 | 1/2014 | Reul et al. |

FOREIGN PATENT DOCUMENTS

| | | |
|---|---|---|
| CN | 103533686 A | 1/2014 |
| DE | 10160806 A1 | 6/2003 |
| DE | 102007008833 A1 | 8/2008 |
| DE | 102008018147 A1 | 10/2009 |
| DE | 102008029986 A1 | 1/2010 |
| JP | S61-091889 U | 6/1986 |
| WO | WO 2011/141487 A1 | 11/2011 |
| WO | 2012/110381 A1 | 9/2012 |
| WO | 2013/050233 A1 | 4/2013 |
| WO | 2014/044410 A1 | 3/2014 |

OTHER PUBLICATIONS

International Search Report for International Application No. PCT/EP2015/079223 filed on Dec. 10, 2015 on behalf of Saint-Gobain Glass France, dated Feb. 19, 2016. 6 pgs.

Written Opinion for International Application No. PCT/EP2015/079223 filed Dec. 10, 2015 on behalf of Saint-Gobain Glass France, dated Feb. 19, 2016. 16 pages. (English + German).

* cited by examiner

TRANSPARENT PANE WITH AN ELECTRICAL HEATING LAYER AND PRODUCTION METHOD THEREOF

CROSS REFERENCE TO RELATED APPLICATIONS

The present application is the U.S. national stage of International Patent Application PCT/EP2015/079223 filed internationally on Dec. 10, 2015, which, in turn, claims priority to European Patent Application No. 14198262.9 filed on Dec. 16, 2014.

The invention is in the field of pane technology and relates to a transparent pane with an electrical heating layer as well as a method for its production.

Transparent panes with an electrical heating layer are known per se and have already been frequently described in the patent literature. Reference is made merely by way of example in this regard to DE 10 2007 008 833 A1, DE 10 2008 018147 A1, DE 10 2008 029986 A1, WO 2013/050233 A1 and WO 2014/044410 A1. In motor vehicles, they are frequently used as windshields since, due to legal regulations, the central field of vision must have no substantial vision restrictions. By means of the heat generated by the heating layer, condensed moisture, ice, and snow can be removed in a short time.

The heating current is usually introduced into the heating layer by at least one pair of strip- or band-shaped electrodes. As collection conductors, these should, as uniformly as possible, introduce the heating current into the heating layer and distribute it broadly. The electrical sheet resistance of the heating layer is relatively high with the materials currently used in industrial series production and can be on the order of a few ohms per unit area. In order to nevertheless obtain adequate heating power for practical application, the supply voltage must be correspondingly high, but, for example, in motor vehicles, only an on-board voltage from 12 to 24 V is standardly available. Since the sheet resistance of the heating layer increases with the length of the current paths of the heating current, the collecting conductors of opposite polarity should have the smallest possible distance between them. For motor vehicle windows, which are usually wider than they are high, the collecting conductors are therefore arranged along the two longer pane edges such that the heating current can flow over the shorter path of the pane height. However, this design results in the fact that the region of a resting or parking position of windshield wipers provided to wipe the pane customarily lies outside the heating field such that adequate heating power is no longer available there and the wipers can freeze.

Consequently, it is necessary to arrange additional heating means in the region of the resting or parking position of the windshield wipers. In DE 101 60 806 A1, for example, the resting or parking region can be heated by a section of the electrical heating layer, which is contacted by means of other collecting conductors and additional external connections.

In WO 2012/110381 A1, in contrast, the pane in the resting and parking region is heated by a wire heater. The wire heater has the disadvantage that the pane is adequately heatable only in the immediate vicinity of the wire, resulting in relatively low homogeneity of the heating power and temperature distribution. Low homogeneity of the heating power results in greater energy use with a desired or specified deicing time.

In contrast, the object of the present invention consists in advantageously improving transparent panes with an electrical heating layer. This and other objects are accomplished according to the proposal of the invention by a transparent pane with the characteristics of the independent claim. Advantageous embodiments of the invention are indicated by the characteristics of the subclaims.

The transparent pane according to the invention comprises:
- an electrical heating layer that extends at least over part of the pane surface III and which is divided into a main heating region and an additional heating region electrically isolated therefrom,
- connection means, which can be electrically connected to a voltage source and which comprise at least a first collecting conductor and a second collecting conductor, with the collecting conductors electrically conductively connected in each case to the heating layer in the main heating region in direct contact such that after application of a supply voltage, a heating current flows across a heating field formed by the heating layer,
- at least one electrical line heating element that is arranged, at least in sections, preferably at least for the most part, and particularly preferably completely, in the additional heating region of the heating layer, wherein
- the line heating element is electrically conductively connected to the heating layer in direct contact,
- the line heating element can be electrically connected to a voltage source,
- the line heating element has such ohmic resistance that after application of the supply voltage, the additional heating region can be heated, and
- the line heating element is implemented such that after application of the supply voltage between sections of the line heating element, a heating current can flow through the heating layer in the additional heating region and the additional heating region can thus be additionally heated.

The heating layer is an electrically heatable, transparent layer and extends at least over a substantial part of the pane surface.

The heating layer is divided into a main heating region and an additional heating region electrically isolated therefrom.

The main heating region extends in particular over the (central) field of vision of the pane and can be electrically connected by electrical connection means to a voltage source. The connection means have external connections that are provided for connecting to the two poles of a voltage source. In addition, the connection means include at least two collecting conductors, which serve for introducing a heating current into the heating layer and which are electrically connected to the heating layer such that after application of the supply voltage, a heating current flows across a heating field formed by the heating layer. The collecting conductors can, for example, be implemented in the form of strip or band electrodes ("bus bars"), in order to introduce the heating current broadly distributed into the heating layer. Preferably, the collecting conductors are electrically conductively connected over their full band length to the heating layer in direct contact. Compared to the high-ohmic heating layer, the collecting conductors have a relatively low or low-ohmic electrical resistance.

The pane according to the invention also has at least one additional heating region, in which the heating layer is electrically isolated from the main heating region. The additional heating region is thus not directly heatable by the heating current introduced into the heating layer by the collecting conductors.

At least one line-shaped electrically heatable heating element (hereinafter referred to as "line heating element") is arranged in the additional heating region. The line heating element is in direct contact with the heating layer in the additional heating region and thus electrically conductively connected thereto.

The line heating element is arranged, at least in sections, in the additional heating region. In an advantageous embodiment of the pane according to the invention, the line element is arranged at least predominantly in the additional heating region of the heating layer. "At least predominantly" means more than 50% of the length of the line heating element, preferably more than 70%, and particularly preferably more than 90%.

The line heating element can be arranged, particularly with a rectangular, triangular, trapezoidal, sinusoidal, or generally meander-shaped course, in particular in the reversal regions, for example, in the upper and/or lower region outside the heating layer in a heating-layer-free region, as in the heating-layer-free edge region or heating-layer-free separating region. Thus, a further increase in the homogeneity of the heating power distribution and of the temperature distribution is achieved and local overheating, so-called hot spots, is reduced or avoided.

In another advantageous embodiment, the line heating element is arranged substantially completely in the additional heating region of the heating layer. This is particularly advantageous when maximum heating power is desired in the additional heating region.

The line heating element has such ohmic resistance that after application of a supply voltage on the connectors of the line heating element, the line heating element heats up and the additional heating region is thus electrically heatable.

The line heating element is electrically conductively connected to the heating layer by direct contact. The line heating element according to the invention is implemented such that after application of a supply voltage between sections of the line heating element, a heating current can flow through the heating layer in the additional heating region. Thus, the additional heating region is additionally heatable. This means that due to the difference in potential between two sections of the line heating element and due to the electrical contact between the line heating element and the heating layer, a local heating current flows through the zone of the heating layer between the sections and the heating layer can be additionally heated up locally there.

By means of the synergistic interaction of the heating of the line heating element by a current component that flows in and along the line heating element and heats it as well as the heating of the heating layer by another current component that flows through the heating layer and heats it, a particularly high homogeneity of the heating power distribution and, hence, of the temperature distribution in the additional heating region can be achieved. Moreover, by means of the line layout and the selection of the ohmic resistance of the line heating element, a significant rise in the heating power and a selective increase in the heating power in the desired zones of the additional heating region can be achieved.

The line heating element can be connected to the same voltage source to which the heating layer of the main heating region is also electrically connected. Here, it is particularly advantageous for the line heating element to be electrically connected to the electrical connection means of the heating layer in the main heating region in parallel electrical connection with the heating field. The line heating element can, for this purpose, for example, directly electrically contact the collecting conductors or connecting conductors that are connected to the collecting conductors. The line heating element can thus be supplied through the connection means of the heating layer of the main heating region with the same supply voltage as the heating layer in the main heating region itself. This has the particular advantage that separate external connections for the additional heating region can be dispensed with.

However, it can be advantageous to connect the line heating element to separate external connections and preferably to another voltage source, for example, to avoid connection conductors on the pane or when the line heating element is to be operated with a higher or lower voltage.

The electrical division of the main heating field and the additional heating field is preferably done by a heating-layer-free separating region. The separating region is preferably produced by laser ablation, masking during deposition, grinding, or other decoating methods. Laser ablation is particularly simple, fast, and, thus, economical in terms of process technology. Moreover, the appearance of the pane is affected only negligibly or not at all by laser ablation. The width d of the separating regions is 0.02 mm to 5 mm and preferably 0.1 mm to 0.3 mm. When a connection conductor is arranged in the separating region, the separating region advantageously has a width of 5 mm to 30 mm.

If the pane according to the invention is implemented as a motor vehicle windshield, the additional heating region can, for example, be the region of a resting or parking position of windshield wipers provided for wiping the pane. In this case, the pane according to the invention makes it possible, in a particularly advantageous manner, not to require a separate supply line to the line heating element on the lower edge of the pane.

In the pane according to the invention, the line heating element can be electrically connected to the connection means of the heating layer by connection conductors different from the line heating element. This measure enables a particularly simple and economical electrical connection of the line heating element to the connection means of the heating layer. Here, it can, in particular, be advantageous in terms of production technology for the connection conductors to be arranged at least partially in a heating-layer-free edge zone of the pane or in a heating-layer-free separating region between the main heating region and the additional heating region of the heating layer. As a result, an electrically insulating sheathing of the connection conductors can be dispensed with. The connection conductors can, for their part, have ohmic resistance such that they heat up upon application of a voltage and can thus, for example, heat the heating-layer-free separating region.

In a particularly advantageous embodiment, the pane according to the invention is implemented as a composite pane with two individual panes bonded to one another by a thermoplastic adhesive layer, wherein the heating layer is situated on at least one surface of the individual panes and/or on one surface of a carrier arranged between the individual panes. It is understood that the two individual panes do not necessarily have to be made of glass, but that they can also be made of a non-glass material, for example, plastic.

In an advantageous embodiment of the pane according to the invention, the at least one line heating element is implemented in the form of a, for example, metallic heating wire or heating band, which enables particularly simple and economical technical realization. Preferably, the heating wire has a diameter in the range from 35 to 150 μm and is implemented such that it has ohmic resistance in the range from 0.1 to 1 ohm/m such that, in particular with a supply voltage in the range from 12 to 48 V, a desired heating power can be obtained. Preferably, the heating wire is implemented such that it, in particular with a supply voltage in the range from 12 to 48 V, makes heating power in the range from 400 to 1000 W/m$^2$ pane surface available. For the case in which the heating wire has at least one curved wire section, it is preferable for the curved wire section to have a radius of curvature of more than 4 mm such that the practical handlability during laying is improved and the risk of breakage is reduced.

In an alternative advantageous embodiment of the pane according to the invention, the at least one line heating element is implemented in the form of a heating line made of a printed-on conductive paste. The conductive paste contains, for example, silver particles and glass frits and can, for example, be applied by screen printing on the pane surface. Then, the conductive paste is heated and fired and thus fixed. Advantageously, the connection conductors are formed in the same manner. The specific conductivity of the screen printing paste is preferably from $5*10^6$ S/m to $100*10^6$ S/m and particularly preferably from $20*10^6$ S/m to $50*10^6$ S/m.

The heating line preferably has a thickness of 4 μm to 20 μm and particularly preferably of 6 μm to 14 μm. The heating line preferably has a width of 0.5 mm to 4 mm and particularly preferably of 1 mm to 2.5 mm. The heating line preferably has a length of 1000 mm to 10,000 mm and particularly preferably of 2000 mm to 70,000 mm. The heating line preferably has ohmic resistance of 0.2 ohm/m to 8 ohm/m and particularly preferably of 0.5 ohm/m to 4 ohm/m, such that, in particular with a supply voltage in the range from 12 to 48 V, a desired heating power can be obtained. Preferably, the heating line is implemented such that it can, in particular with a supply voltage in the range from 12 to 48 V, make available a desired heating power in the range from 400 to 1000 W/m$^2$ pane surface.

A line heating element according to the invention made of a printed heating line has the particular advantage that it can be applied in one process step with printed-on collecting conductors and, optionally, with printed-on connection conductors, for example, by a screen printing method. This is particularly economical and particularly simple to realize from a production technology standpoint.

The line heating element according to the invention is preferably implemented with a meander-shaped, sinusoidal, triangular, trapezoidal, or rectangular course. By means of the periodic interval and the amplitude of the course, the difference in potential between adjacent sections of the line heating element can be adjusted and different heating power distributions can be achieved. It is understood that different course shapes, periodic intervals, amplitudes, thicknesses, widths, and specific resistances of the heating line or of the heating wire can vary within different sections of the line heating element in order to thus achieve optimum homogeneity in heating power distribution and temperature distribution. This is particularly advantageous when the additional heating region of the heating layer has a wound or curved course and does not have a constant width or when zones must not be covered or crossed by the line heating element, for example, when, in the installation position, the vehicle identification number is to be arranged below the pane.

Preferred line heating elements according to the invention have nonrectangular courses. With rectangular courses, With rectangular courses, a drop in potential occurs in the region of the sections of the line heating elements that are arranged parallel to the direction of current flow through the heating layer, which results in local degradation of the heating current through the heating layer and, thus, in a local degradation of the heating current density in the immediate vicinity of these parallel sections. The local degradation results, in turn, in an undesirable inhomogeneity in the heating power distribution.

In another advantageous embodiment of the invention, the line heating element has a periodic course, where, within a period, the sections of the line heating element are arranged nonparallel and non-antiparallel to one another. Particularly preferably, within a period, all sections that are arranged nonparallel to the direction of current flow through the heating layer, are arranged nonparallel and non-antiparallel to one another. By this means, a particularly advantageous homogenization of the heating power distribution can be achieved through the current flowing through the heating layer within the heating layer, In another advantageous embodiment of the invention, the line heating element is implemented trapezoidal in shape. It is particularly preferred for the sum of the bases of the trapezoidal course to be less than or equal to half the periodic interval of the trapezoidal course. The periodic interval is the length of the course over which one of the periodic structures extends. By this means, a particularly advantageous homogenization of the heating power distribution can be achieved within the heating layer through the current flowing through the heating layer.

In another advantageous embodiment of the invention, the line heating element has a periodic course, where the distance between a section of the line heating element before the reversal point (or the reversal region), in other words, the amplitude maximum or amplitude minimum to a section of the line heating element after the reversal point (or the reversal region) decreases continuously in the course direction. The section of the line heating element before the reversal point (or the reversal region) transitions either directly into the section after the reversal point or another section situated in the reversal region (for example, a section parallel to the current direction through the heating layer, for example, the base in the case of a trapezoidal course) between the two sections. As a result of the electrical conductivity of the line heating element, a voltage drop between corresponding sections of the line heating element occurs in the region of the reversal points (or reversal regions). However, since the path of the current flow is shortened by the reduced distance between the sections, the voltage drop is compensated and, in comparison with regions farther from the reversal points, approx. the same heating power density is achieved. This is particularly advantageous in order to achieve high homogeneity in the heating power distribution of the heating layer.

The invention further extends to a method for producing a transparent pane, wherein at least:

a) one electrical heating layer is deposited on at least part of the pane surface (III), b) the electrical heating layer is divided into a main heating region and an additional heating region electrically isolated therefrom, preferably by laser ablation, c) at least one first collecting conductor and one second collecting conductor are applied on the heating layer in the main heating region, wherein the collecting conductors are electrically conductively connected to the heating layer in direct contact such that after application of a supply voltage from a voltage source on connecting conductors connectable to the collecting conductors, a heating current flows across a heating field formed by the heating layer, d) at least one electrical line heating element is applied on the heating layer in the additional heating region, wherein
- the line heating element is electrically conductively connected to the heating layer in direct contact,
- the line heating element can be electrically connected to the connecting conductors in parallel electrical connection with the heating field or is electrically connected to the collecting conductors of the heating layer in the main heating region,
- the line heating element has ohmic resistance such that after application of the supply voltage, the additional heating region can be heated, and
- the line heating element is implemented such that after application of a supply voltage between sections of the line heating element, a heating current can flow through the heating layer in the additional heating region and the additional heating region can be additionally heated thereby, e) connection conductors are applied on the pane surface (III), by which the line heating element is connected to the collecting conductors or can be connected to connecting conductors, f) the connecting conductors are applied on the pane surface (III) and are electrically connected to the collecting conductors, the line heating element, and/or the connection conductors in direct contact.

In an advantageous embodiment of the method according to the invention, the collecting conductors, the line heating element, and the connection conductors are applied by screen printing onto the pane surface (III). Here, it is particularly advantageous for the process steps c), d), and e) to be performed simultaneously in one process step. This is particularly economical and particularly simple to realize from a production technology standpoint.

The invention further extends to the use of a transparent pane as described above as a functional and/or decorative single piece and as an assembly part in furniture, appliances and buildings, as well as in means of transportation for travel on land, in the air, or on water, in particular in motor vehicles, for example, as a windshield, rear window, side window, and/or glass roof.

In a particularly advantageous use according to the invention of the transparent pane as a windshield or rear window, the additional heating region is arranged in the resting or parking zone of windshield wipers provided for wiping of the pane. This has the particular advantage that the resting or parking zone can be deiced particularly quickly and efficiently.

It is understood that the different embodiments can be realized individually or in any combinations. In particular the above-mentioned characteristics and those detailed in the following can be used not only in the combinations specified, but also in other combinations or alone without departing from the scope of the present invention.

The invention is now explained in detail using exemplary embodiments with reference to the accompanying figures. They depict in simplified, not-true-to-scale representation:

FIG. 1A a schematic plan view of an exemplary embodiment of a pane according to the invention;

FIG. 1B a cross-sectional view along the section line A-A' of the pane according to the invention of FIG. 1A;

FIG. 1C an enlarged view of the detail B of the pane according to the invention of FIG. 1A;

FIG. 1D an enlarged view of an alternative exemplary embodiment of a line heating element according to the invention;

FIG. 1E an enlarged view of an alternative exemplary embodiment of a line heating element according to the invention;

FIG. 2 a schematic plan view of an alternative exemplary embodiment of a pane according to the invention;

FIG. 3A a schematic plan view of an alternative exemplary embodiment of a pane according to the invention;

FIG. 3B a cross-sectional view along the section line A-A' of the pane according to the invention of FIG. 3A;

FIG. 3C an enlarged view of the detail C of an alternative exemplary embodiment of the pane according to the invention of FIG. 3A;

FIG. 3D a cross-sectional view along the section line A-A' of an alternative exemplary embodiment of the pane according to the invention of FIG. 3A;

FIG. 4 a schematic representation of the method according to the invention;

FIG. 5A an isoline diagram of a simulation of the heating power distribution in a heating layer of the additional heating region with a rectangular course of the line heating element;

FIG. 5B a grayscale diagram of the simulation of FIG. 5A;

FIG. 6A an isoline diagram of a simulation of the heating power distribution in a heating layer of the additional heating region with a triangular course of the line heating element;

FIG. 6B a grayscale diagram of the simulation of FIG. 6A.

FIG. 1A depicts a pane according to the invention using the example of a motor vehicle windshield referenced as a whole with the reference character 1. The windshield 1 is implemented as a composite pane.

FIG. 1B depicts a cross-sectional view along the section line A-A' of FIG. 1A. The windshield 1 comprises a rigid outer pane 2 and a rigid inner pane 3, both implemented as individual panes and bonded to one another via a thermoplastic adhesive layer 4, here, for example, a polyvinyl butyral film (PVB), ethylene vinyl acetate film (EVA), or polyurethane film (PU). The basic structure of such a composite pane is well known to the person skilled in the art, for example, from industrial series production of motor vehicles so it need not be discussed in detail here. The two individual panes 2, 3 are approx. the same size, have a roughly trapezoidal curved contour, and are, for example, made of glass, also possibly being produced from a non-glass material such as plastic. For an application other than as a windshield, it is also possible to produce the two individual panes 2, 3 from a flexible material.

The contour of the windshield 1 is defined by a pane edge 5, which is composed, according to the trapezoidal shape, of two long pane edges 5a, 5a' (top and bottom in the installed position) and two short pane edges 5b, 5b' (left and right in the installed position). A transparent heating layer 6 serving for electrical heating of the windshield 1 is deposited on the side of the inner pane 3 ("side III") bonded to the adhesive layer 4. The heating layer 6 is applied substantially to the entire surface of the inner pane 3, with a peripheral edge strip 7 on all sides of the inner pane 3 not coated such that a heating layer edge 8 is set back inwardly relative to the pane edge 5 by a width r. The width r is, for example, 10 mm. This measure serves for electrical isolation of the heating layer 6 relative to the outside. In addition, the heating layer 6 is protected against moisture penetrating from the pane edge 5, which can otherwise result in corrosion of the heating layer 6.

In a manner known per se, the heating layer 6 comprises a layer sequence with at least one electrically conductive metallic sublayer, preferably silver, and, optionally, other sublayers such as antireflective and blocker layers. Advantageously, the layer sequence has high thermal stability such that it withstands the high temperatures required for the bending of glass panes of typically more than 600° C. without damage, but also with the possibility of providing layer sequences with low thermal stability. Instead of being applied directly on the inner pane 3, it could also, for example, be applied on a plastic film that is subsequently bonded to outer and inner pane 2, 3. The heating layer 6 is, for example, applied by sputtering (magnetron cathodic sputtering). The sheet resistance of the heating layer 6 is, for example, in the range from 0.1 to 6 ohm/unit area.

The heating layer 6 is electrically conductively connected to a first collecting conductor 10 and to a second collecting conductor 11 in direct contact. The two collecting conductors 10, 11 are in each case implemented band-shaped or strip-shaped and serve as connection electrodes for the broad introduction of a supply current into the heating layer 6. For this, the collecting conductors 10,11 are, for example, arranged over their full band length on the heating layer 6, with the first collecting conductor 10 extending along the upper long pane edge 5a and the second collecting conductor 11 extending roughly along the lower long pane edge 5a'. The two collecting conductors 10, 11 are made, for example, from the same material and can be produced, for example, by printing a paste onto the heating layer 6, for example, by the screen printing method. Alternatively, however, it would also be possible to produce the collecting conductors 10, 11 from narrow metal foil strips, for example, made of copper or aluminum. These can, for example, be fixed on the adhesive layer 4 and arranged on the heating layer 6 at the time of the bonding of the outer and inner pane 2, 3. Electrical contact can be guaranteed during the bonding of the individual panes by the action of heat and pressure.

A first connecting conductor 12, which is implemented here, for example, as a flat-band conductor (e.g., narrow metal foil), is electrically connected to the first collecting conductor 10. The connecting conductor 12 has, for example, a first external connection 20, which is provided for the connection to one pole (for example, the minus pole) of a voltage source 25 for providing a supply voltage. The first connecting conductor 12 is arranged roughly in the center of the upper long pane edge 5a. A second connecting conductor 13, which is likewise implemented here, for example, as a flat-band conductor (e.g., narrow metal foils), is electrically connected to the second collecting conductor 11, and has a second external connection 21', which is provided for the connection to the other pole (for example, the plus pole) of the voltage source 25. The connecting conductors 12,13 are, for example, provided with a plastic insulation sheath, preferably made of polyimide, and thus electrically insulated in order to avoid a short-circuit with other electrically conductive and/or voltage-carrying structures in the pane 1.

A heating field 17, in which a heating current 16 flows upon application of a supply voltage, is enclosed by the two collecting conductors 10, 11. Due to negligible ohmic resistance compared to the heating layer 6, the collecting conductors 10, 11 heat up only a little and make no appreciable contribution to the heating power. It is understood that the ohmic resistance of the collecting conductors 10,11 can also be selected such that selective heating of pane regions by the collecting conductors 10,11 is enabled.

As has already been explained in the introduction, the connection resistance of the heating layer 6 increases with the length of the current paths of the heating current 16 such that it is advantageous in terms of satisfactory heating power for the two collecting conductors 10, 11 to have the smallest possible distance between them. For this reason, it makes sense to implement a lower pane region, which is no longer part of the field of vision, but corresponds to the region of a resting or parking position of windshield wipers provided for wiping the pane, as an additional heating region 14, which is electrically isolated from the main heating region 9. Nevertheless, the heating layer 6, which is, however, not situated between the two collecting conductors 10, 11, is situated in the additional heating region 14, cannot be flowed through by the heating current 16 and thus cannot be heated by the collecting conductors 10,11.

In order to prevent electrical short circuits, the main heating region 9 of the heating layer 6 is electrically and, in particular, galvanically isolated from the additional heating region 14, for example, by a heating-layer-free separating region 19 of a width d of, for example, 100 µm. The heating layer 6 is removed in the separating region 19, for example, by laser ablation. Alternatively, the heating layer 6 can also be mechanically removed or already be excluded by shadowing during coating.

In order to heat the additional heating region 14, it has an electrically heatable line heating element 15. The line heating element 15 is formed, for example, by a sinusoidally curved linear electrically conductive structure, hereinafter referred to as "heating line". The heating line preferably has a periodicity of 30 to 60 and, for example, 50 and an amplitude of 20 mm to 70 mm and, for example, 60 mm and extends along the lower pane edge 5a' over the entire longer width of the pane 1. The heating line is made, for example, of a printed-on electrically conductive paste and is preferably printed at the same time as the collecting conductors 10,11 in a screen printing method onto the inner pane 3. The heating line is printed directly onto the heating coating 6 and thus directly contacted with it over its entire length and electrically conductively connected thereto. The width b of the heating line is preferably between 0.5 mm and 4 mm and here, for example, 1 mm. The thickness of the heating line is, for example, 10 µm and the specific resistance $2.3*10^{-8}$ ohm*m of the line length. It is understood that the line heating element 15 can also be formed by an another electrically conductive structure, for example, a heating wire such as a tungsten wire.

The line heating element 15 is directly connected in this example to a connection to the second collecting conductor 11 on its outer end via an electrical line connection 26'. In the simplest case, the printed heating line transitions there continuously into the printed collecting conductor 11. The other connection of the line heating element 15 is connected, in this example, via a connection conductor 23 to the first collecting conductor 10. The connection conductor 23 is, for example, a printed-on conductor, which runs along the heating-layer-free edge strip 7 along the pane edge 5b. The connection conductor 23 can have the same dimensions as the heating line in the additional heating region 14 and can heat the pane 1 in the edge region upon application of a supply voltage. Usually, the connection conductor 23 is implemented lower ohmic such that no appreciable voltage drop takes place there and no warming occurs. By means of the above-described circuitry, the line heating element 15 is electrically connected to the connection means 10, 11, 12, 13, of the heating layer 6 in parallel electrical connection with the heating field 17 and, thus, no additional connection is necessary for the line heating element 15 in the additional heating region 14.

FIG. 1C depicts an enlarged detail B of the additional heating region 14 of the exemplary embodiment of a pane according to the invention 1 of FIG. 1A. The sinusoidally running heating line can be divided in each case into two directly adjacent sections 18a and 18b of the the heating line.

Upon application of a supply voltage, a heating current 16 flows between the collecting conductors 10,11 through the heating field 17. Because of the parallel electrical connection of the line heating element 15 to the collecting conductors 10,11 of the heating field 17, a current likewise flows through the line heating element 15. Since the line heating element 15 is in direct electrical contact with the heating layer 6 in the additional heating region 14, the current flow splits: Part of the current $I_Z$ flows through the line heating element 15 itself, here, in other words, along the printed-on electrically conductive heating line, for example, in the section 18a. Due to the difference in potential, a current $I_{H1-3}$ additionally flows through a region of the heating layer 6, which is situated in each case between two adjacent sections 18a,18b of the line heating element 15. Here, the current density is a function of the difference in potential between the sections 18a and 18b and is determined by the shape of the heating line, the specific resistance of the heating line, and the specific resistance of the heating layer 6 and can be optimized in the context of simple simulations. Both current components result in a heating current and, thus, in heating of the pane 1 in the respective region. By means of the combination of the two current components $I_Z$, $I_{H1-3}$, greater homogeneity of the heating power distribution and greater homogeneity of the resultant temperature distribution can be achieved in the additional heating region 14 than would, for example, be the case with a heating line without an additional heating layer. This was unexpected and surprising for the person skilled in the art.

The higher homogeneity of the heating power distribution and the higher homogeneity of the temperature distribution are particularly advantageous here when the additional heating region 14 is arranged, as depicted in this example, in the region of the parking and resting position of windshield wipers and these can be deiced quickly and reliably.

FIG. 1D depicts an enlarged view of an alternative exemplary embodiment of a line heating element according to the invention 15. Here, the heating line has a triangular course. Here, as well, a splitting of the current flow into a component $I_Z$ along the heating line and a component $I_{H1-3}$ through the heating layer 6 occurs, which results in a homogenization of the heating power distribution in the additional heating region 14 of the heating layer 6.

FIG. 1E depicts an enlarged view of another alternative exemplary embodiment of a line heating element 15 according to the invention. Here, the heating line has a rectangular course. Here, as well, a splitting of the current flow into a component $I_Z$ along the heating line and a component $I_{H1-3}$ through the heating layer 6 occurs, which results in a homogenization of the heating power distribution in the additional heating region 14 of the heating layer 6 in comparison with a line heating element 15 that is not arranged on a heating layer 6. However, rectangularly running line heating elements 15, which are arranged according to the invention on a heating layer 6, have lower homogeneity than nonrectangularly running line heating elements 15.

It is understood that the periodicity, the width b, and the thickness of the heating line and the shape of its course can vary across the pane 1 and, thus, selectively determined regions are increasingly heatable.

The heating line preferably, but not necessarily, contains a metallic material, in particular silver and glass frits. The heating line has, for example, ohmic resistance in the range from 0.2 ohm to 8 ohm/m, which has suitable heating power for practical use with the customary onboard voltage of a motor vehicle of 12 to 48 V. Preferably, heating power in the range from 400 to 1000 W/m² of pane surface in the additional heating region 14 can be made available.

The main heating region 9 and the additional heating region 14 of the heating layer 6 can have other heating-layer-free regions, for example, for forming one or a plurality of communication windows. Alternatively, the line heating element 15 in the additional heating region 14 can also be routed such that it has one or a plurality of sections without a printed heating line, for example, in order to ensure an undisturbed view of a vehicle identification number below the pane 1.

FIG. 2 depicts a schematic plan view of an alternative exemplary embodiment of a pane 1 according to the invention. To avoid unnecessary repetition, only the differences relative to the exemplary embodiment of FIG. 1 are explained and, otherwise, reference is made to the statements made there. Accordingly, the windshield 1 has a heating field 17, as was already depicted in FIG. 1A.

Two line heating elements 15,15' are arranged in the additional heating region 14. The two line heating elements 15,15' consist of heating lines, which correspond in their dimensions to those of FIG. 1A. However, the two line heating elements 15,15' are electrically conductively connected roughly in the center of the pane to the second connecting conductor 13 of the lower second collecting conductor 11 in the electrical line connection 26'. The connecting conductor 13 can be implemented here, for example, as a non-insulated flat-band conductor (e.g., narrow metal foils). The respective outer connections of the line heating elements 15,15' are electrically conductively connected via two connection conductors 23,23', which run in each case in the heating-layer-free edge strip 7 parallel to the pane edges 5b and 5b', to the respective ends of the first collecting conductor 10 on the upper pane edge 5a of the pane 1. In this manner, the supply voltage can be fed into two line heating elements 15,15', which, in each case, heat only one half of the additional heating region 14. Thus, a significantly higher heating power can be achieved than in the case of FIG. 1A.

In this exemplary embodiment, two second connecting conductors 13, 13', which are implemented here, as well, for example, as insulated flat-band conductors (e.g., narrow metal foils), are electrically connected to the second collecting conductor 11 and have, in each case, two second external connections 21, 21', which are provided for the connection to the other pole (for example, the plus pole) of the voltage source 25.

Figure 2:
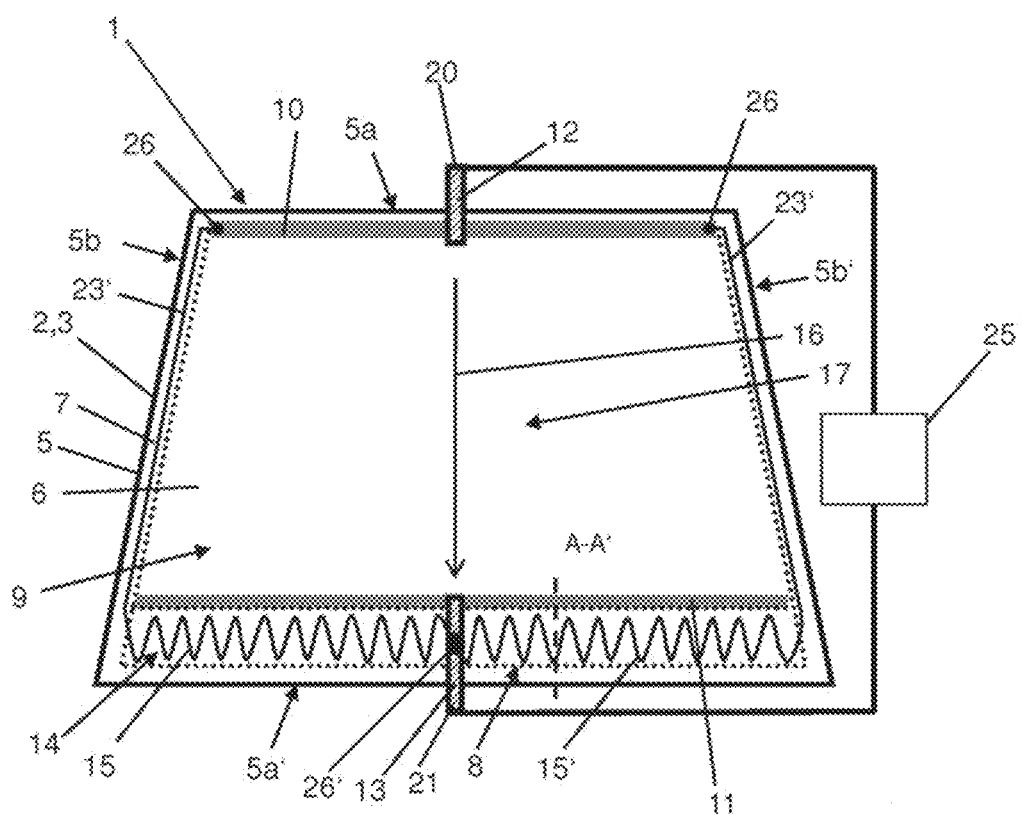

Two line heating elements 15,15', which are connected on their outer connections via connection conductors 23,23' to the first collecting conductors 10, are arranged in the additional heating region 14 as in FIG. 2. The two connections of the line heating elements 15,15', which are arranged in the pane center, are contacted here via other connection conductors 23",23''' to the outer ends of the second collecting conductors 11 via the electrical line connections 26" and 26'". For this, the separating region 19 is implemented with a width d of 3 mm. The connection conductors 23" and 23'" are arranged within the separating region 19 and are printed, for example, by means of screen printing directly on the side III of the inner pane 3.

The connection conductors 23", 23'" in the separating region 19 were dimensioned such that the connection conductors 23",23'" can be heated by application of a supply voltage on the outer connections 20, 21, 21' of the pane 1. This has a particular advantage that, by this means, the separating region 19 can be selectively heated and deiced.

Figure 3A:
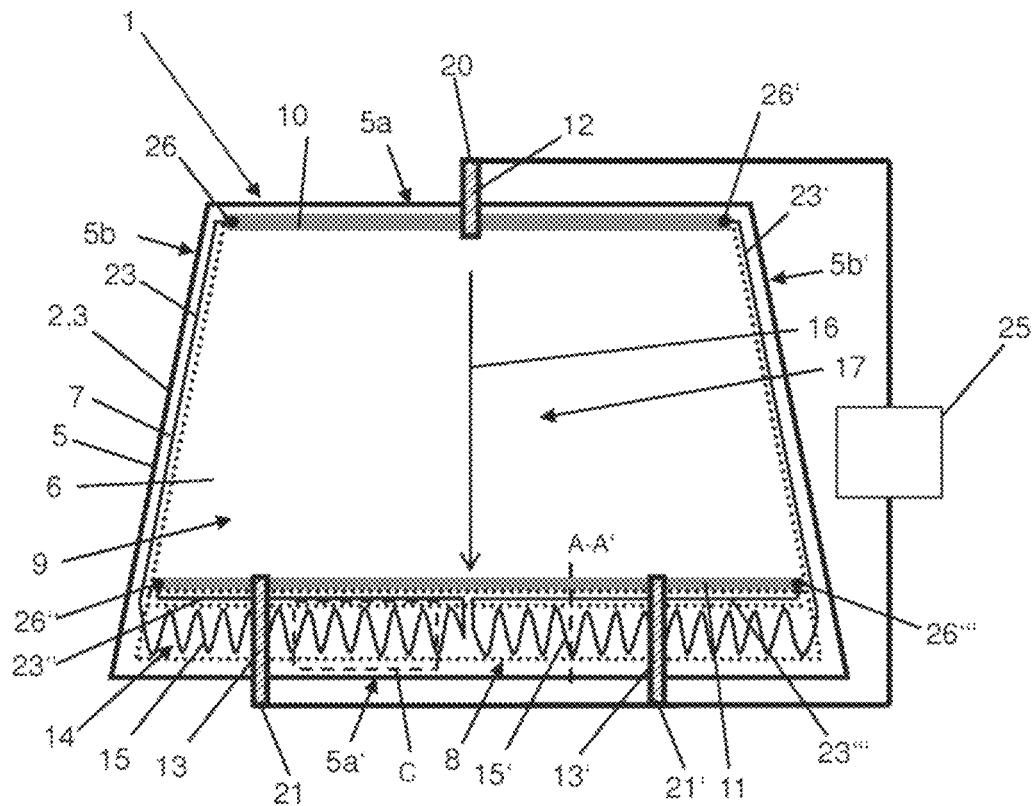
FIG. 3A depicts a schematic plan view of another alternative exemplary embodiment of a pane 1 according to the invention.
Figure 3B:
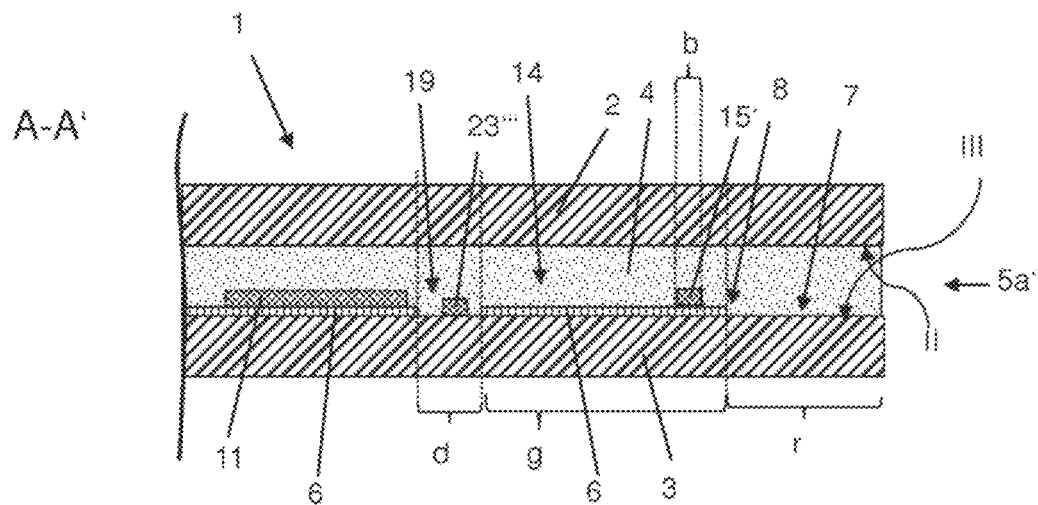
FIG. 3B depicts a cross-sectional view along the section line A-A' of the pane according to the invention of FIG. 3A. To avoid unnecessary repetition, only the differences relative to the exemplary embodiment of FIGS. 1A and 1B are explained and, otherwise, reference is made to the statements made there.
Figure 3C:
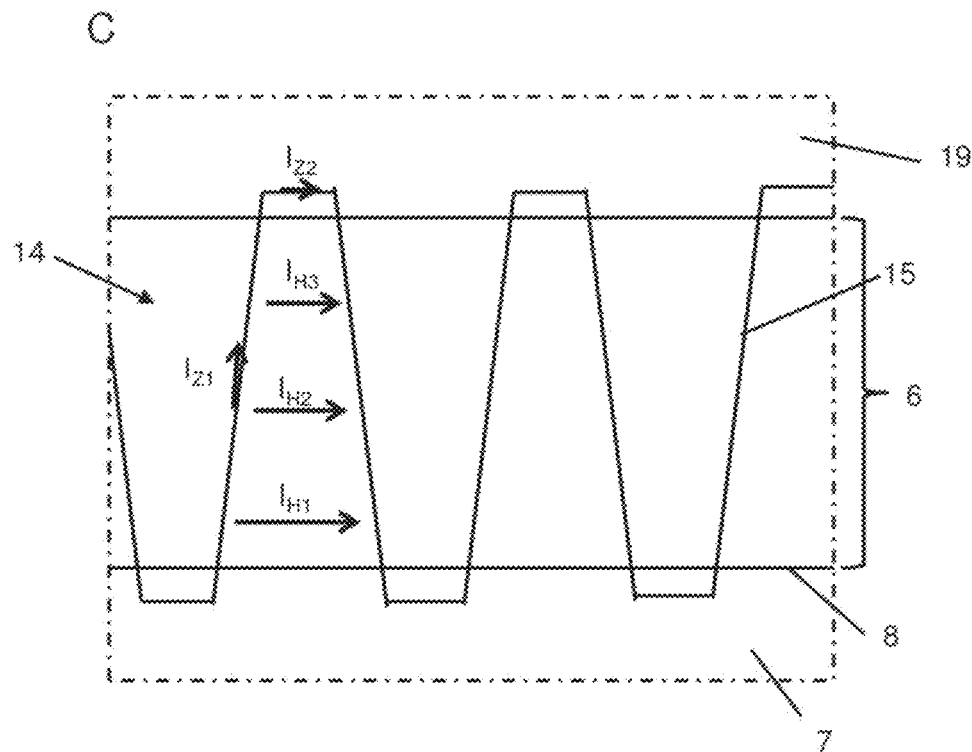

FIG. 3C depicts an alternative exemplary embodiment according to the invention in an enlarged detail C of FIG. 3A. In contrast to FIG. 3A, here, the line heating element 15 has a trapezoidal course. Here, as well, a splitting of the current flow into a component $I_Z$ along the heating line and and a component $I_{H1-3}$ through the heating layer 6 occurs. Here, the line heating element 15 lies, in sections, outside the heating layer 6 of the additional heating region 14. The bases, i.e., the parallel sides of the trapezoidal course, are arranged outside the additional heating region 14. In other words, the upper bases are arranged above the additional heating region 14 in the heating-layer-free separating region 19. The lower bases are arranged below the additional heating region 14 in the heating-layer-free edge region 7. By means of this measure, local temperature elevations (so-called hot spots) are reduced in the upper and lower region of the trapezoidal course here, which results in a further improvement of the heating power distribution. It is understood that this design results, even for other courses of the line heating elements 15,15', such as the rectangular, meander-shaped, triangular, or sinusoidal course, in an improvement of the homogeneity of the heating power distribution and of the temperature distribution.

Figure 3D:
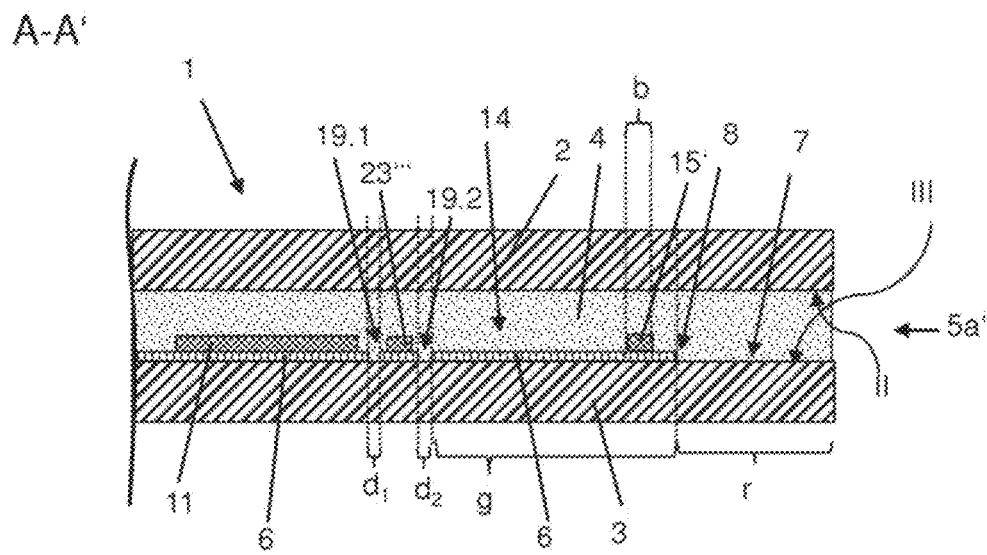

FIG. 3D depicts an alternative exemplary embodiment according to the invention. In contrast to the exemplary embodiment of FIG. 3B, here, the separating region 19 is implemented in the form of two separating regions 19.1 and 19.2, which have in each case only a width $d_{1,2}$ of 0.25 mm. The separating regions 19.1, 19.2 are implemented such that they form a region of the heating layer 6 electrically isolated from the surrounding heating layer 6. The connection conductors 23" and 23'" are then arranged on the electrically isolated region between the separating regions 19.1, 19.2.

Figure 4:
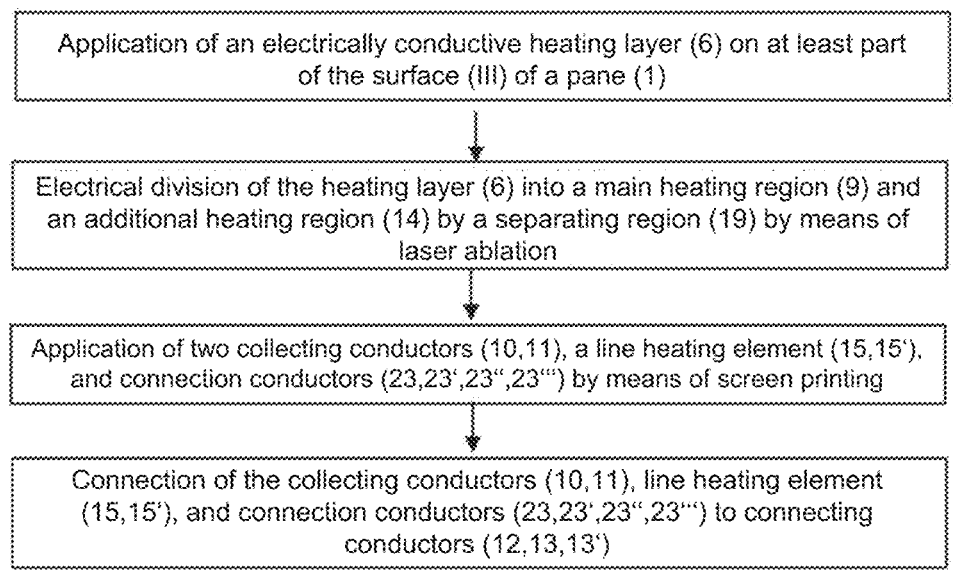

FIG. 4 depicts the schematic flow of an exemplary method according to the invention for producing a transparent pane 1 according to the invention.

An exemplary production method for the windshield 1 is described schematically in the following:

First, the outer and inner pane 2, 3 are cut in the desired trapezoidal shape from a glass blank. Then, the inner pane 3 is coated with the heating layer 6 by sputtering, wherein the edge strip 7 is not coated through the use of a mask. Alternatively, it would also be possible to first coat a glass blank, from which the inner pane 3 is then cut. The inner pane 3 pretreated in this manner is decoated for forming the edge strip 7, which can be done in industrial series production, for example, by a mechanically degrading grinding wheel or by laser ablation.

Subsequently or simultaneously, the heating layer 6 is electrically isolatingly divided into a main heating region 9 and an additional heating region 14, for example, by decoating a separating region 19 or a plurality of separating regions 19.1,19.2. The separating region 19,19.1,19.2 is preferably decoated by laser ablation. This has the particular advantage that reliable electrical isolation can be achieved and, at the same time, the separating region 19, 19.1,19.2 is only minimally noticeable visually.

Then, the two collecting conductors 10, 11, the line heating element 15,15', as well as any connection conductors 23,23',23",23'" are printed on the inner pane 3, for example, by screen printing. A silver printing paste, for example, can be used as the printing paste. Then, the printing paste is pre-fired, followed by bending of the panes 2, 3 at a high temperature. An electrical connection of the collecting conductors 10,11 to the first and second connecting conductors 12, 13, 13' can be made, for example, by soldering or fixing using a conductive adhesive, for example, by ultrasonic welding. Then, the outer and inner pane 2, 3 are positioned together and bonded by means of the adhesive layer 4.

The invention makes available a transparent pane 1 with an electrical heating layer 6, in which at least one line heating element 15, 15' is arranged in an additional heating region 14 of the pane 1, which element is connected to the electrical connection means 10,11,12, 13,13' of the heating layer 6. Separate external connections for the line heating element 15,15' can advantageously be dispensed with. By means of the implementation according to the invention of the line heating element 15,15' in electrical contact with the heating layer 6, great homogeneity of the heating power distribution and of the temperature distribution during electrical heating is achieved. This was unexpected and surprising for the person skilled in the art.

Figures 5A, 5B:
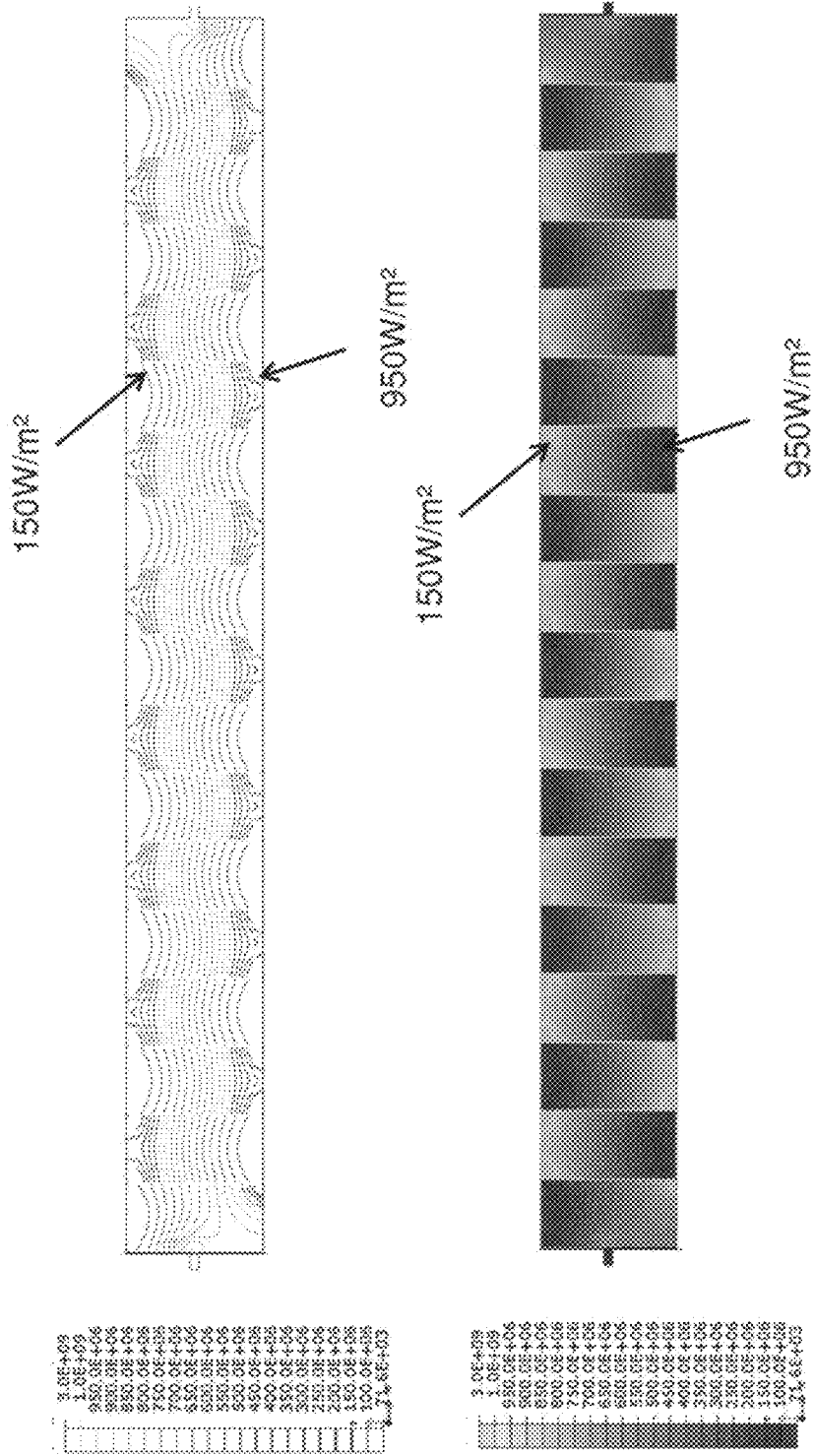

FIG. 5A and FIG. 5B show the simulation of the heating power distribution in a heating layer 6 of an additional heating region 14 with a rectangular course of the line heating element 15. FIG. 5A depicts an isoline diagram, in other words, a diagram of lines with an equal value in the heating power distribution. FIG. 5B depicts a grayscale diagram of the heating power distribution. In each case, the heating power distribution is depicted as heating power density in units W/m².

Figures 6A, 6B:
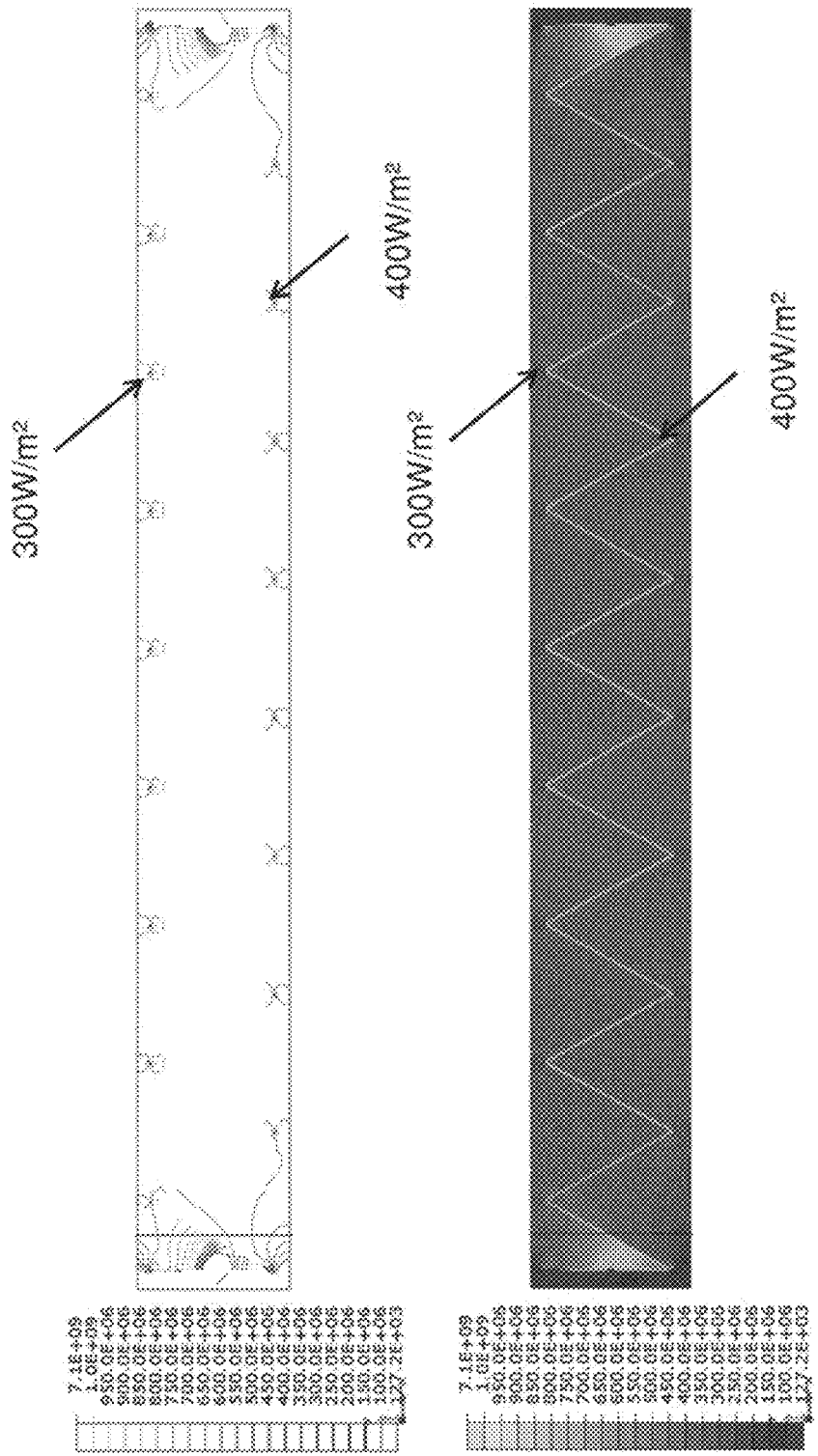

FIG. 6A and FIG. 6B show the simulation of the heating power distribution in a heating layer 6 of an additional heating region 14 with a triangular course of the line heating element 15. FIG. 6A depicts an isoline diagram, in other words, a diagram of lines with an equal value in the heating power distribution. FIG. 6B depicts a grayscale diagram of the heating power distribution. In each case, the heating power distribution is depicted as heating power density in units W/m².

FIGS. 5A and 5B and FIGS. 6A and 6B differ in the shape of the course of the line heating element 15.

The simulations were based in each case on a rectangular strip of heating layer 6 with sheet resistance of 0.9 ohm/square and a supply voltage of 14 V on the two ends of the line heating element 15. The amplitude of the linear course was, in each case, 80 mm from peak to peak and the periodic interval was 80 mm. The periodic course is repeated 9 times in each case.

Figure 1A:
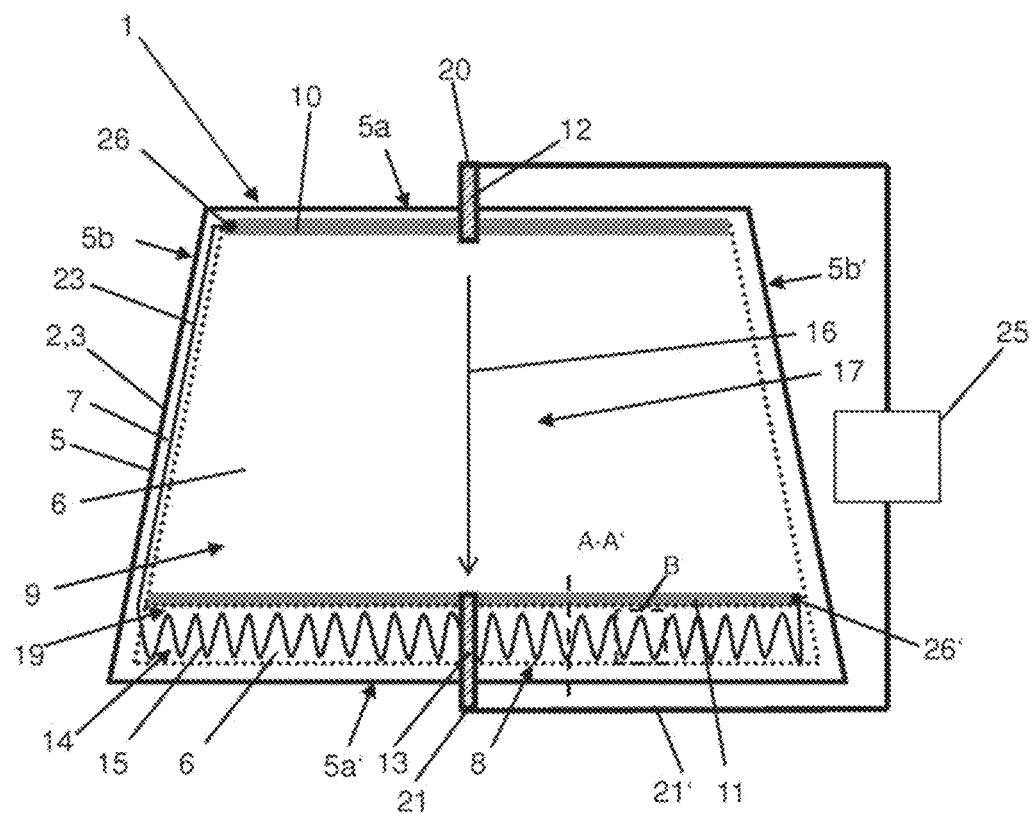
Figure 1B:
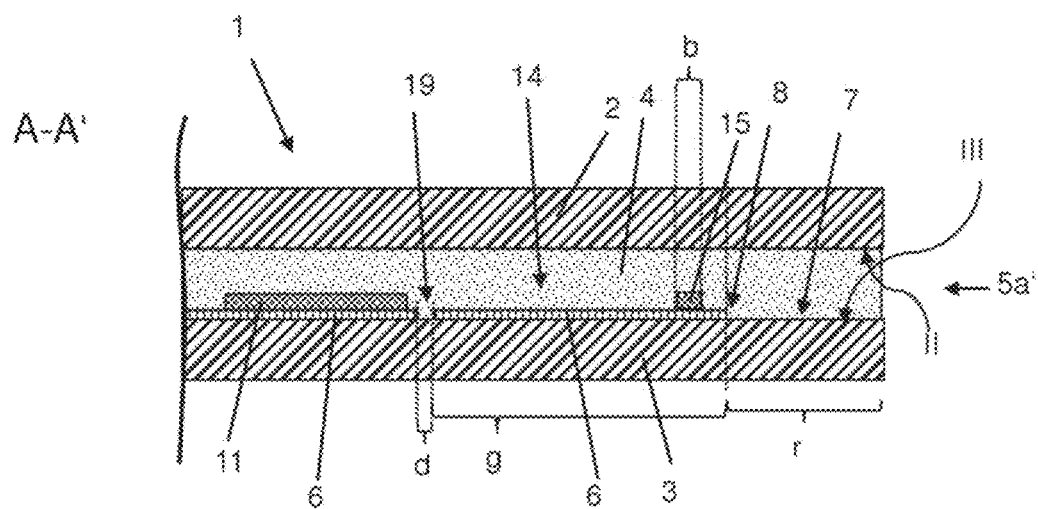
Figure 1C:
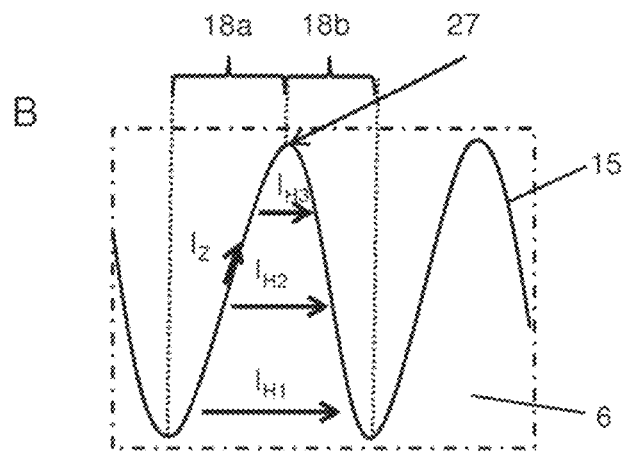
Figure 1D:
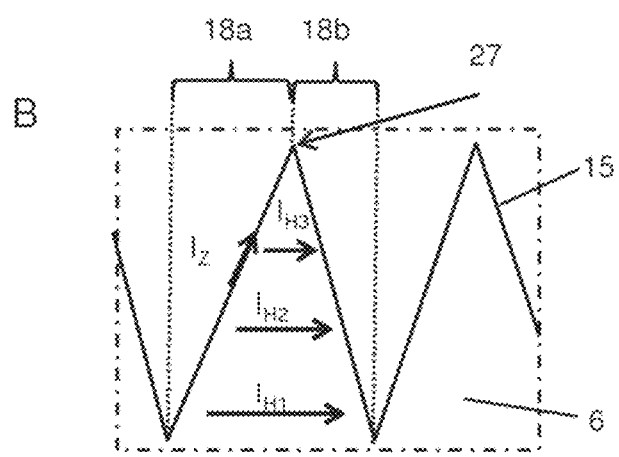
Figure 1E:
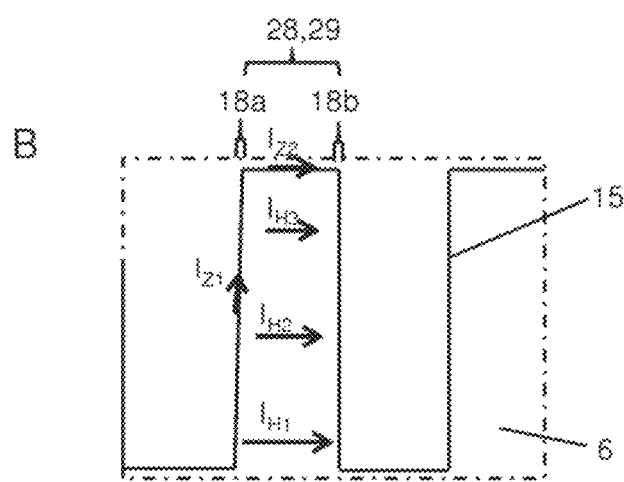

FIG. 5A depicts the isoline diagram and FIG. 5B the grayscale diagram of a rectangular course of the line heating element 15, as is depicted in the detail of FIG. 1E. In FIGS. 5A and 5B, the line heating element 15 in the sections 18a runs parallel to the line heating element 15 in the sections 18b. In other words, the distance between the sections 18a before the reversal region 29 and the sections 18b after the reversal region 29 is constant. The current $I_{Z1}$ along the line heating element 15 flows antiparallel (i.e., opposite the flow direction) in a section 18a through the line heating element 15 in the section 18b. At the same time, the current $I_{Z1}$ runs along the line heating elements 15 in the section 18a and 18b orthogonal to the overall current direction through the additional heating region 14 and orthogonal to the current flow $I_{H1}$, $I_{H2}$, and $I_{H3}$ through the heating layer 6.

In the reversal region 29, in which another section 28 of the line heating element 15 directly connects the sections 18a and 18b of the line heating element, a current $I_{Z2}$ flows through the section 28 of the line heating element 15. The difference in potential between the regions of the line heating element 15 adjacent the section 28 is reduced by the current flow $I_{Z2}$ in the sections 18a and 18b. This results in the fact that the current flow $I_{H3}$ through the heating layer 6 in these adjacent regions is lower than the current flow $I_{H1}$ and $I_{H2}$ through the heating layer 6 in more remote regions. Due to the antiparallel arrangement of the line heating element 15 in the sections 18a and 18b, the distance between the sections 18a and 18b is equidistant to one another. The lower current flow $I_{H3}$ through the heating layer 6 results in a drastic reduction of the heating power density in the region adjacent the section 28 and in a significant increase in the heating power density in the remote regions. In FIGS. 5A and 5B, the heating power density in the regions adjacent the section 28 is 150 W/m² and in the more remote regions as much as 950 W/m². A high heating power density of 950 W/m², in this case, can result in accelerated aging and degradation of the heating layer 6 and is undesirable. Moreover, high inhomogeneity develops in the heating power distribution of the heating layer 6, which is also undesirable.

FIG. 6A depicts an isoline diagram and FIG. 6B a grayscale diagram of a triangular course of the line heating element 15, as is depicted in the detail of FIG. 1D. In FIGS. 6A and 6B, the sections 18a and 18b of the line heating element 15 in the reversal point 27 are directly adjacent one another. Due to the triangular course, the line elements 15 of the sections 18a are arranged neither parallel nor antiparallel to the line elements 15 of the sections 18b. The distance between the sections 18a and 18b decreases continuously in the direction of the course. In other words, the current $I_Z$ along the line heating element 15 in the section 18a runs neither parallel nor antiparallel to the current $I_Z$ through the line heating element 15 in the section 18b. At the reversal points 27 at which the sections 18a and 18b of the line heating element 15 are adjacent one another, in other words, at the points of maximum or minimum amplitude of the triangular course, the difference in potential between the line heating element 15 in the corresponding sections 18a and 18b is reduced since the sections 18a and 18b are connected electrically conductively connected to one another in the reversal point 27.

At the same time, the distance between the line heating element 15 in the sections 18a and 18b is reduced due to the triangular course. In other words, the distance between corresponding points of the line heating element 15 in section 18a and points of the line heating element 15 in section 18b decreases when approaching the connection point in the reversal point 27 between section 18a and section 18b roughly proportionally to the amount that the difference in potential drops. The result is that the current flow through the heating layer 6 remains approx. constant, in other words $I_{H3}$ is almost as great as $I_{H2}$ and almost as great as $I_{H1}$. With a constant sheet resistance of the heating layer 6, the constant current $I_{H1,2,3}$ results in a constant heating power density.

In FIGS. 6A and 6B, the maximum heating power density is 400 W/m² and the minimum heating power density is 350 W/m². In other words, the heating power distribution in the heating layer 6 is very homogeneous and in an optimum heating range of the heating layer 6. This is particularly advantageous for avoiding overheating and accelerated aging and degradation of the heating layer 6. This was unexpected and surprising for the inventors. At the same time, it was possible, through the arrangement of a line heating element 15 according to the invention, to increase the heating power in the additional heating region 14.

LIST OF REFERENCE CHARACTERS 1 pane, windshield
2 individual pane, outer pane
3 individual pane, inner pane
4 adhesive layer
5 pane edge
5a, 5a' long pane edge
5b, 5b' short pane edge
6 heating layer
7 edge strip
8 heating layer edge
9 main heating region
10 first collecting conductor
11 second collecting conductor
12 first connecting conductor
13, 13' second connecting conductor
14 additional heating region
15, 15' line heating element
16 heating current
17 heating field
18a, 18b section of the line heating element 15
19,19.1,19.2 separating region
20 first external connection
21, 21' second external connection
23, 23' connection conductor
24 supply line
25 voltage source
26,26',26'',26''' electrical line connection
27 reversal point
28 another section of the line heating element 15
29 reversal region
A-A' cross section line,
B,C detail
b width of the line heating element 15,15'
d width of the separating region 19
g width of the additional heating region 14
$I_{H1}$, $I_{H2}$, $I_{H3}$ current through the heating layer 6 in the additional heating region 14
$I_Z$, $I_{Z1}$, $I_{Z2}$ current through the line heating element 15,15'
r width of the edge strip 7
II pane surface of the outer pane 2
III pane surface of the inner pane 3

The invention claimed is:

1. A transparent pane comprising:
an electrical heating layer extending at least over a part of a pane surface, and being divided into a main heating region and an additional heating region electrically insulated from the main heating region,
a connection means, configured to be electrically connected to a voltage source, wherein the connection means comprises a first collecting conductor and a second collecting conductor, wherein the first and second collecting conductors are electrically connected to the electrical heating layer in direct contact with the main heating region such that, upon application of a supply voltage, a heating current flows across a heating field formed by the main heating region of the electrical heating layer,
and at least one electrical line heating element, arranged, at least in sections, in the additional heating region of the electrical heating layer, wherein the line heating element is in direct contact with and electrically connected to the heating layer, the line heating element is configured to be electrically connected to the voltage source or to another voltage source, the line heating element has an ohmic resistance for heating the additional heating region upon application of the supply voltage, and the line heating element is configured such that, upon application of the supply voltage, a heating current can flow between sections of the line heating element through the heating layer in the additional heating region, the additional heating region being configured for being additionally heated, wherein the line heating element is meander-shaped and not rectangular.

2. The pane according to claim 1, wherein the line heating element is electrically connected to the connection means in a parallel electrical connection with the heating field.

3. The pane according to claim 2, wherein at least one connection conductor is electrically connected to the line heating element and at least one of the connection means.

4. The pane according to claim 3, wherein the connection conductors are arranged, at least in regions, in a heating-layer-free edge strip of the pane and/or at least in regions in a heating-layer-free separating region between the main heating region and the additional heating region.

5. The pane according to claim 2, wherein at least one connection of the line heating element is in direct electric contact with one of the collecting conductors.

6. The pane according to claim 2, wherein the connection means comprises one or more connecting conductors connected to the first and second collecting conductors and wherein at least one connection of the line heating element is in direct electrical contact with at least one of the connecting conductors.

7. The pane according to claim 2, wherein the line heating element and/or the connection conductor are a heating wire or a heating line made of a printed-on electrically conductive paste.

8. The pane according to claim 7, wherein the heating line has a thickness of 6 µm to 14 µm, a width of 0.2 mm to 8 mm, a length of 1000 mm to 10000 mm, and/or a specific resistance of $0.5*10^{-8}$ ohm*m to $5*10^{-8}$ ohm*m.

9. The pane according to claim 7, wherein the line heating element is configured such that when the supply voltage is in a range from 12 to 48 V, a deicing power in a range from 400 to 1000 W/m² of pane surface is available.

10. The pane according to claim 7, wherein the line heating element has an ohmic resistance of 0.5 ohm/m to 4 ohm/m.

11. The pane according to claim 7, wherein the line heating element is trapezoidal.

12. The pane according to claim 11, wherein a sum of bases is less than or equal to the half of the periodic interval.

13. The pane according to claim 7, wherein the line heating element has a periodic course and within a period, sections of the line heating element are arranged nonparallel and non-antiparallel to one another.

14. The pane according to claim 7, wherein the line heating element has a periodic course and within a period, sections which are arranged nonparallel to the direction of the current flow through the heating layer are arranged nonparallel and non-antiparallel to one another.

15. The pane according to claim 7, wherein the line heating element has a periodic course and within a period, a distance between the section of the line heating element before a reversal point or before a reversal region and the section of the line heating element after the reversal point or after a reversal region decreases continuously.

16. The pane according to claim 1, wherein the pane is a composite pane comprising two individual panes bonded to one another by a thermoplastic adhesive layer, wherein the heating layer is situated on at least one surface of the two individual panes and/or on one surface of a carrier arranged between the two individual panes.

17. A method comprising:

using the transparent pane according to claim 1 as a functional and/or decorative single piece, as an assembly part in furniture, appliances, or buildings, or as a windshield, rear window, side window, and/or glass roof in a means of transportation for travel on land, in the air, or on water, wherein a resting or parking zone of windshield wipers provided to wipe the pane is arranged in the additional heating region of the pane.

18. The pane according to claim 1, wherein the line heating element is sinusoidal or triangular.

19. A method for producing a transparent pane, comprising the steps of:

a) depositing an electrical heating layer on at least one part of a pane surface, b) dividing the electrical heating layer into a main heating region and an additional heating region electrically insulated from the main heating region, c) applying at least one first collecting conductor and one second collecting conductor on the electrical heating layer in the main heating region, wherein the first and second collecting conductors are in direct contact with and electrically connected to the electrical heating layer, such that upon application of a supply voltage from a voltage source on connecting means connectable to the first and second collecting conductors, a heating current can flow across a heating field formed by the main heating region of the heating layer, d) applying at least one electrical line heating element, at least in sections, on the heating layer in the additional heating region, wherein the line heating element is in direct contact with and electrically connected to the heating layer, the line heating element is configured to be electrically connected to the connecting means in parallel electrical connection with the heating field or is configured to be electrically connected to the first and second collecting conductors of the heating layer in the main heating region, the line heating element has an ohmic resistance for heating the additional heating region, upon application of the supply voltage, and the line heating element is configured such that after application of the supply voltage between sections of the line heating element, a heating current can flow through the heating layer in the additional heating region, the additional heating region being configured for being additionally heated, wherein the line heating element is implemented meander-shaped and not rectangular, e) applying at least one connection conductor on the pane surface, wherein the line heating element is connected to the first and second collecting conductors and/or connected to the connecting means, f) applying the connecting means on the pane surface wherein the connecting means is in direct contact with and electrically connected to the first and second collecting conductors, the line heating element, and/or the at least one connection conductor.

20. The method for producing a transparent pane according to claim 19, wherein the first and second collecting conductors, the line heating element, and the at least one connection conductor are applied by screen printing an electrically conductive paste onto the pane surface.

21. The method according to claim 19, wherein c), d), and e) are performed simultaneously.

22. The method according to claim 19, comprising dividing the electrical heating layer into a main heating region and an additional heating region by laser ablation.

* * * * *